US012781893B2

(12) United States Patent
Harris et al.

(10) Patent No.: US 12,781,893 B2
(45) Date of Patent: Nov. 3, 2026

(54) MAGNETIC CONNECTOR ASSEMBLY FOR PNEUMATIC VALVES

(71) Applicant: NSV GROUP FZCO, Dubai (AE)

(72) Inventors: Victor Harris, Dubai (AE); Niels Hag, Dubai (AE)

(73) Assignee: NSV GROUP FZCO, Dubai (AE)

( * ) Notice: Subject to any disclaimer, the term of this patent is extended or adjusted under 35 U.S.C. 154(b) by 27 days.

(21) Appl. No.: 18/977,115

(22) Filed: Dec. 11, 2024

(65) Prior Publication Data

US 2026/0160370 A1 Jun. 11, 2026

(51) Int. Cl.
*F16L 37/00* (2006.01)
*F16K 15/20* (2006.01)
(Continued)

(52) U.S. Cl.
CPC ............ *F16L 37/004* (2013.01); *F16K 15/20* (2013.01); *F16L 37/28* (2013.01); *F16L 37/30* (2013.01); *F16L 37/32* (2013.01); *F16L 37/33* (2013.01); *F16L 37/34* (2013.01); *F16L 37/36* (2013.01); *F16L 37/367* (2013.01); *F16L 37/373* (2013.01); *F16L 37/38* (2013.01); *F16L 37/40* (2013.01); *F16L 37/407* (2013.01); *F16L 37/413* (2013.01); *F16L 37/42* (2013.01); *F16L 37/44* (2013.01); *F16L 37/46* (2013.01); *F16L 37/47* (2013.01); *F16K 27/12* (2013.01)

(58) Field of Classification Search
None
See application file for complete search history.

(56) References Cited

U.S. PATENT DOCUMENTS 879,880 A * 2/1908 Landau .................. F16L 37/32 285/317
3,586,048 A 6/1971 Arnold
(Continued)

FOREIGN PATENT DOCUMENTS

CN 116906707 A 10/2023
EP 2781818 A1 9/2014

OTHER PUBLICATIONS

The International Search Report and Written Opinion for an International application No. PCT/IB2025/062613, dated Feb. 13, 2026.

*Primary Examiner* — Atif H Chaudry
(74) *Attorney, Agent, or Firm* — Quinn IP Law

(57) ABSTRACT

A connector assembly includes a valve adapter at least partially defining a valve adapter internal passageway. The valve adapter includes a valve connector body at least partially defining the valve adapter internal passageway. The valve adapter also includes a strike plate attached adjacent to the distal end of the valve connector body, a valve engagement surface located adjacent to the proximal end of the valve connector body, and a spring-loaded valve pin. The assembly also includes a hose adapter at least partially defines a hose adapter internal passageway. The hose adapter includes a hose connector body at least partially defining the hose adapter internal passageway. The hose adapter also includes a magnet located within a recess adjacent to a distal end of the hose connector body and a spring-loaded retracting pin including a radially outer surface and a radially inner surface extending between a proximal end and a distal end.

20 Claims, 8 Drawing Sheets

(51) Int. Cl.

| | |
|---|---|
| ***F16K 27/12*** | (2006.01) |
| ***F16L 37/28*** | (2006.01) |
| ***F16L 37/30*** | (2006.01) |
| ***F16L 37/32*** | (2006.01) |
| ***F16L 37/33*** | (2006.01) |
| ***F16L 37/34*** | (2006.01) |
| ***F16L 37/36*** | (2006.01) |
| ***F16L 37/367*** | (2006.01) |
| ***F16L 37/373*** | (2006.01) |
| ***F16L 37/38*** | (2006.01) |
| ***F16L 37/40*** | (2006.01) |
| ***F16L 37/407*** | (2006.01) |
| ***F16L 37/413*** | (2006.01) |
| ***F16L 37/42*** | (2006.01) |
| ***F16L 37/44*** | (2006.01) |
| ***F16L 37/46*** | (2006.01) |
| ***F16L 37/47*** | (2006.01) |

(56) References Cited

U.S. PATENT DOCUMENTS

2012/0013117 A1* 1/2012 Bernshtein .............. F16L 37/42
285/9.1
2017/0225528 A1 8/2017 Cheng

* cited by examiner

MAGNETIC CONNECTOR ASSEMBLY FOR PNEUMATIC VALVES

BACKGROUND

The present disclosure related to pneumatic valves, and more particularly, to a connector assembly for interfacing between a pneumatic valve and a pressure source.

Pressure within pneumatic devices, such as vehicle tires, is maintained with pneumatic valves that selectively control the flow of a fluid into or out of the pneumatic device. The pressurized fluid source can include a compressor that fills a tank with a fluid, such as air or nitrogen. The pressurized fluid source can then be connected to the pneumatic device with a hose. The hose generally includes an adapter at a distal end to mate with a valve, such as a Schrader or a Presta valve, on the pneumatic device. The adapter allows the pressurized fluid from the tank to enter the pneumatic device by engaging the valve and creating a passageway for the pressurized fluid to travel from the tank to the pneumatic device.

SUMMARY

Disclosed herein is a connector assembly. The assembly includes a valve adapter at least partially defining a valve adapter internal passageway. The valve adapter includes a valve connector body extending between a proximal end of the valve adapter and a distal end of the valve adapter and at least partially defining the valve adapter internal passageway. The valve adapter also includes a strike plate attached adjacent to the distal end of the valve connector body, a valve engagement surface located adjacent to the proximal end of the valve connector body, and a spring-loaded valve pin configured to move between an extended position configured to engage a pneumatic valve and a retracted position. The assembly also includes a hose adapter at least partially defines a hose adapter internal passageway. The hose adapter includes a hose connector body extending between a proximal end and a distal end and at least partially defining the hose adapter internal passageway. The hose adapter also includes a magnet located within a recess adjacent to a distal end of the hose connector body and a spring-loaded retracting pin including a radially outer surface and a radially inner surface extending between a proximal end and a distal end, wherein the radially inner surface at least partially defines the hose adapter internal passageway and the distal end of the spring-loaded retracting pin is configured to engage the spring-loaded valve pin.

In one aspect of the disclosure the strike plate is comprised of steel.

In one aspect of the disclosure the valve engagement surface is at least partially defined by internal threads.

In one aspect of the disclosure the spring-loaded valve pin includes a spring having a first spring stiffness and the spring-loaded retracting pin includes a spring having a second spring stiffness that is greater than the first spring stiffness.

In one aspect of the disclosure the magnet surrounds the hose adapter internal passageway.

In one aspect of the disclosure the assembly includes a magnetic shell defining a magnet recess with the magnet located therein and defining an opening surrounding the hose adapter internal passageway.

In one aspect of the disclosure the magnet includes an axial magnetization and the magnetic shell is comprised of steel.

In one aspect of the disclosure the assembly includes a seal in engagement with a radially inner surface of the magnet and a radially outer surface of the spring-loaded retracting pin.

In one aspect of the disclosure the proximal end of the hose connector body includes a threaded engagement surface.

In one aspect of the disclosure the valve connector body and the hose connector body are each comprised of a non-ferrous material.

In one aspect of the disclosure the valve connector body and the hose connector body are each comprised of aluminum.

In one aspect of the disclosure the valve engagement surface is configured to engage a first valve type and a proximal end of the hose connector body is configured to engage with valve fitting having a second valve type.

Disclosed herein is a method of operating a connector assembly. The method includes attaching a valve adapter of the connector assembly to a pneumatic valve. The assembly includes a valve adapter at least partially defining a valve adapter internal passageway. The valve adapter includes a valve connector body extending between a proximal end of the valve adapter and a distal end of the valve adapter and at least partially defining the valve adapter internal passageway. The valve adapter also includes a strike plate attached adjacent to the distal end of the valve connector body, a valve engagement surface located adjacent to the proximal end of the valve connector body, and a spring-loaded valve pin configured to move between an extended position configured to engage a pneumatic valve and a retracted position. The method also includes attaching a hose adapter of the connector assembly to a pneumatic hose. The hose adapter at least partially defines a hose adapter internal passageway. The hose adapter includes a hose connector body extending between a proximal end and a distal end and at least partially defining the hose adapter internal passageway. The hose adapter also includes a magnet located within a recess adjacent to a distal end of the hose connector body and a spring-loaded retracting pin including a radially outer surface and a radially inner surface extending between a proximal end and a distal end, wherein the radially inner surface at least partially defines the hose adapter internal passageway and the distal end of the spring-loaded retracting pin is configured to engage the spring-loaded valve pin. The method also includes connecting the hose adapter to the valve adapter and transferring a fluid between the pneumatic hose and the connector assembly.

In one aspect of the disclosure the spring-loaded valve pin includes a spring having a first spring stiffness and the spring-loaded retracting pin includes a spring having a second spring stiffness that is greater than the first spring stiffness.

In one aspect of the disclosure the method includes a magnetic shell defining a magnet recess with the magnet located therein and defining an opening surrounding the hose adapter internal passageway, wherein the magnet surrounds the hose adapter internal passageway.

In one aspect of the disclosure connecting the hose adapter to the valve adapter includes engaging a distal end of a seal surrounding the spring-loaded retracting pin with the strike plate.

In one aspect of the disclosure connecting the hose adapter to the valve adapter includes engaging the spring-loaded retracting pin with the spring-loaded valve pin.

In one aspect of the disclosure connecting the hose adapter to the valve adapter includes engaging the spring-loaded valve pin with a valve core of the pneumatic valve.

Disclosed herein is an assembly. The assembly includes a pneumatic hose configured to exchange a pressurized fluid, a valve fitting attached to a distal end of the pneumatic hose, and a connector assembly for engaging the valve fitting. The connector assembly includes a valve adapter at least partially defining a valve adapter internal passageway.

The valve adapter includes a valve connector body extending between a proximal end of the valve adapter and a distal end of the valve adapter and at least partially defining the valve adapter internal passageway. The valve adapter also includes a strike plate attached adjacent to the distal end of the valve connector body, a valve engagement surface located adjacent to the proximal end of the valve connector body, and a spring-loaded valve pin configured to move between an extended position configured to engage a pneumatic valve and a retracted position. The assembly also includes a hose adapter at least partially defines a hose adapter internal passageway. The hose adapter includes a hose connector body extending between a proximal end and a distal end and at least partially defining the hose adapter internal passageway. The hose adapter also includes a magnet located within a recess adjacent to a distal end of the hose connector body and a spring-loaded retracting pin including a radially outer surface and a radially inner surface extending between a proximal end and a distal end, wherein the radially inner surface at least partially defines the hose adapter internal passageway and the distal end of the spring-loaded retracting pin is configured to engage the spring-loaded valve pin.

In one aspect of the disclosure the assembly includes a pneumatic valve having a first valve type different from a valve type of the valve fitting.

BRIEF DESCRIPTION OF DRAWINGS

Some embodiments of the present disclosure are now described, by way of example only, and with reference to the accompanying drawings. The same reference number represents the same element or the same type of element in all drawings.

DETAILED DESCRIPTION

Those having ordinary skill in the art will recognize that terms such as “above,” “below”, “upward”, “downward”, “top”, “bottom”, “left”, “right”, etc., are used descriptively for the figures, and do not represent limitations on the scope of the disclosure, as defined by the appended claims. Furthermore, the teachings may be described herein in terms of functional and/or logical block components and/or various processing steps.

When filling pneumatic devices, such as pneumatic vehicle tires found on automobiles or bicycles, a connector assembly interfaces with a pneumatic valve to selectively control the transfer of a pressurized fluid, such as air or nitrogen, into the pneumatic device. To properly inflate or deflate the pneumatic device, a connector assembly must be selected that matches the pneumatic valve type. One feature of this disclosure is to quickly and reliably form a connection between the pneumatic valve and the pressure source utilizing a magnetic connection within the connector assembly. Additionally, utilizing the connector assembly disclosed herein can improve longevity of the pneumatic valve by reducing wear to an engagement surface on the pneumatic valve, such as a threaded outer surface.

Figure 1:
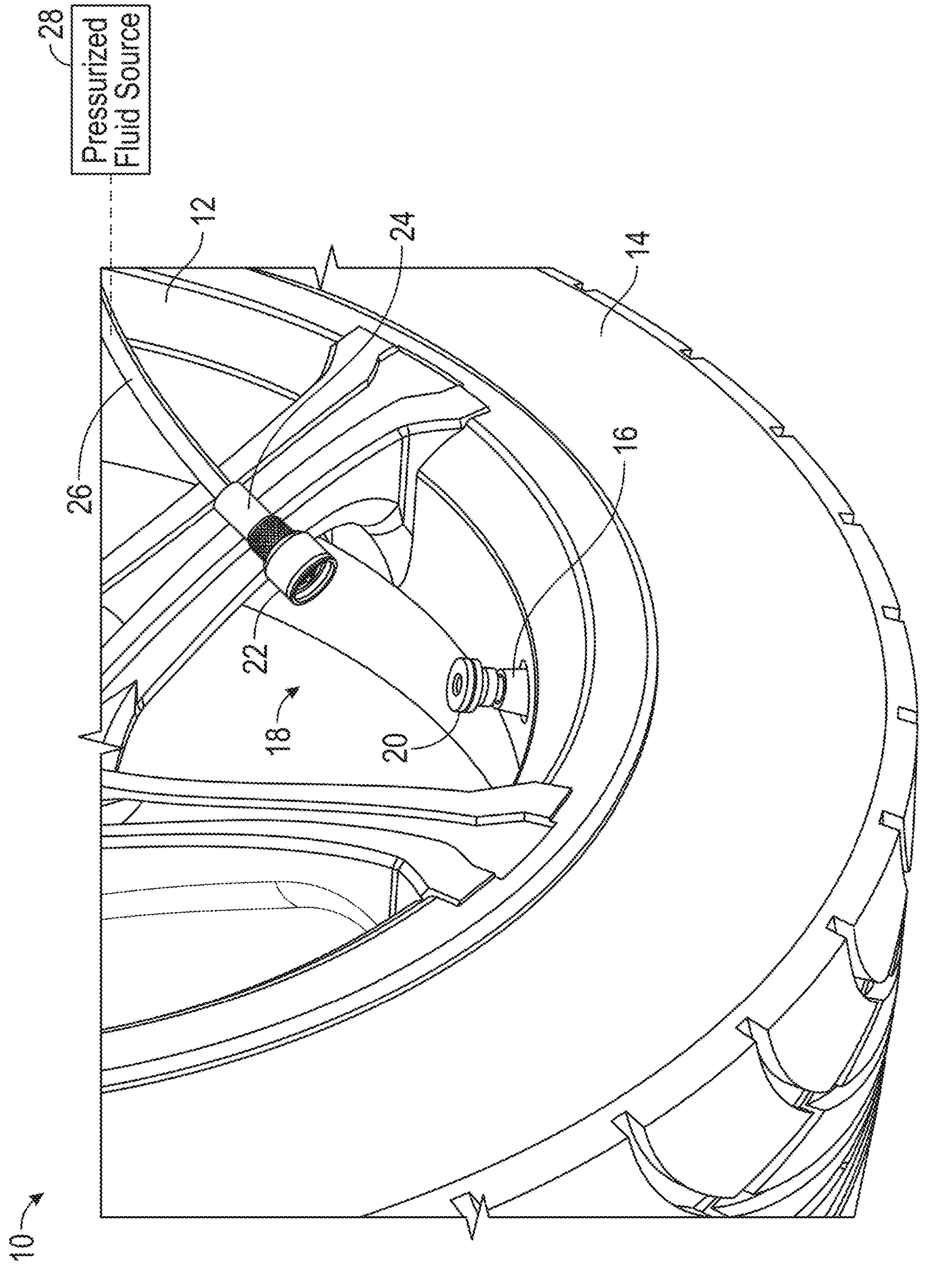
FIG. 1 schematically illustrates an example connector assembly used in connection with a pneumatic valve on a tire.
Figure 2:
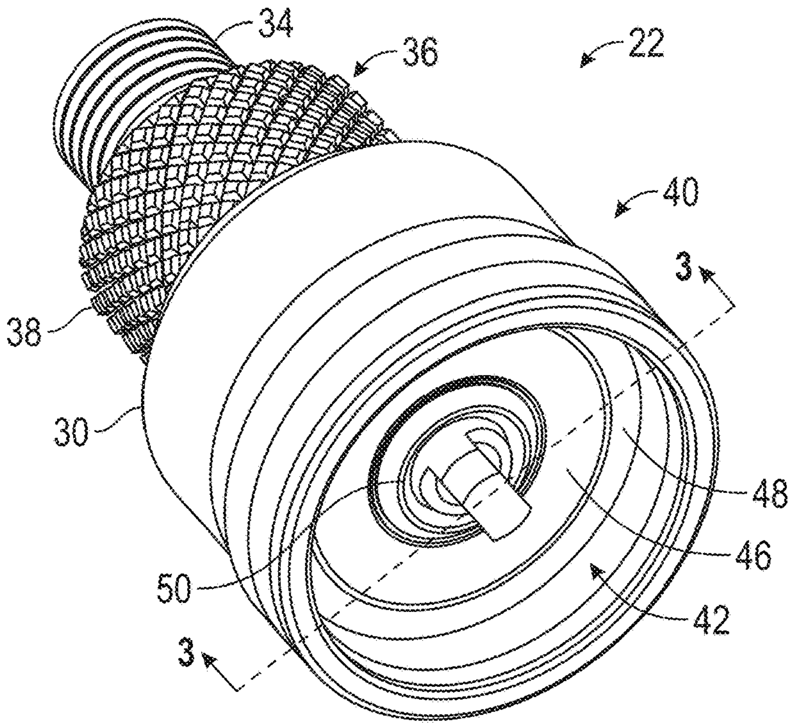
FIG. 2 schematically illustrates a perspective view of a hose adapter from the connector assembly of FIG. 1.
Figure 3:
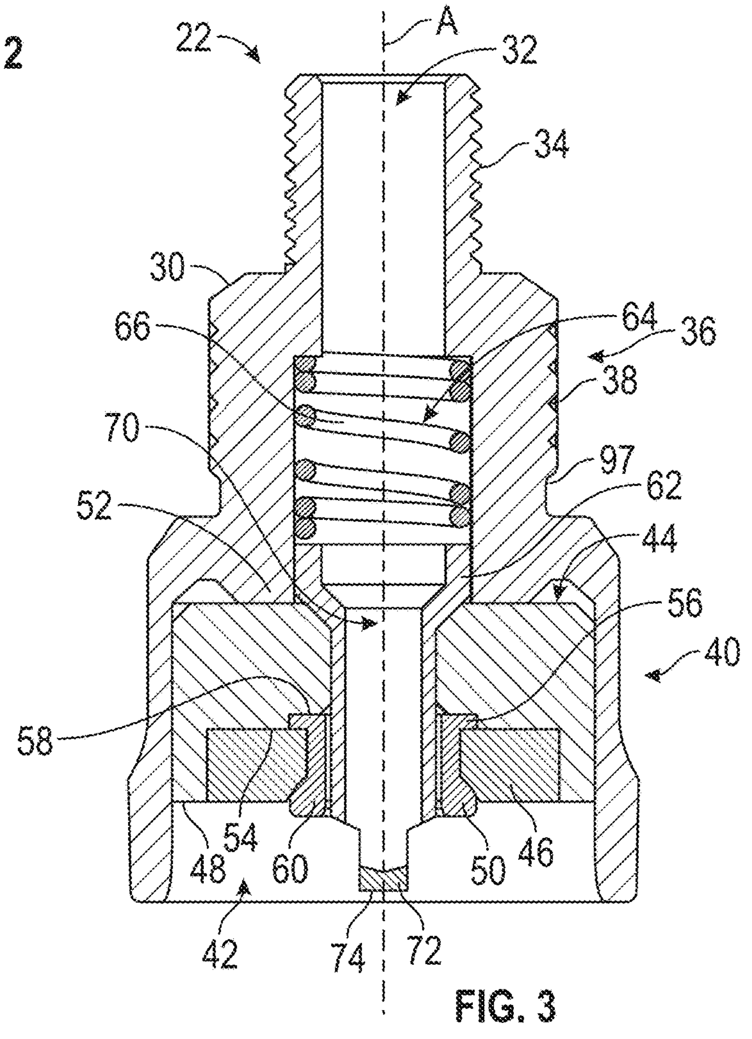
FIG. 3 is a cross-sectional view taken along line 3-3 of FIG. 2.
Figure 4:
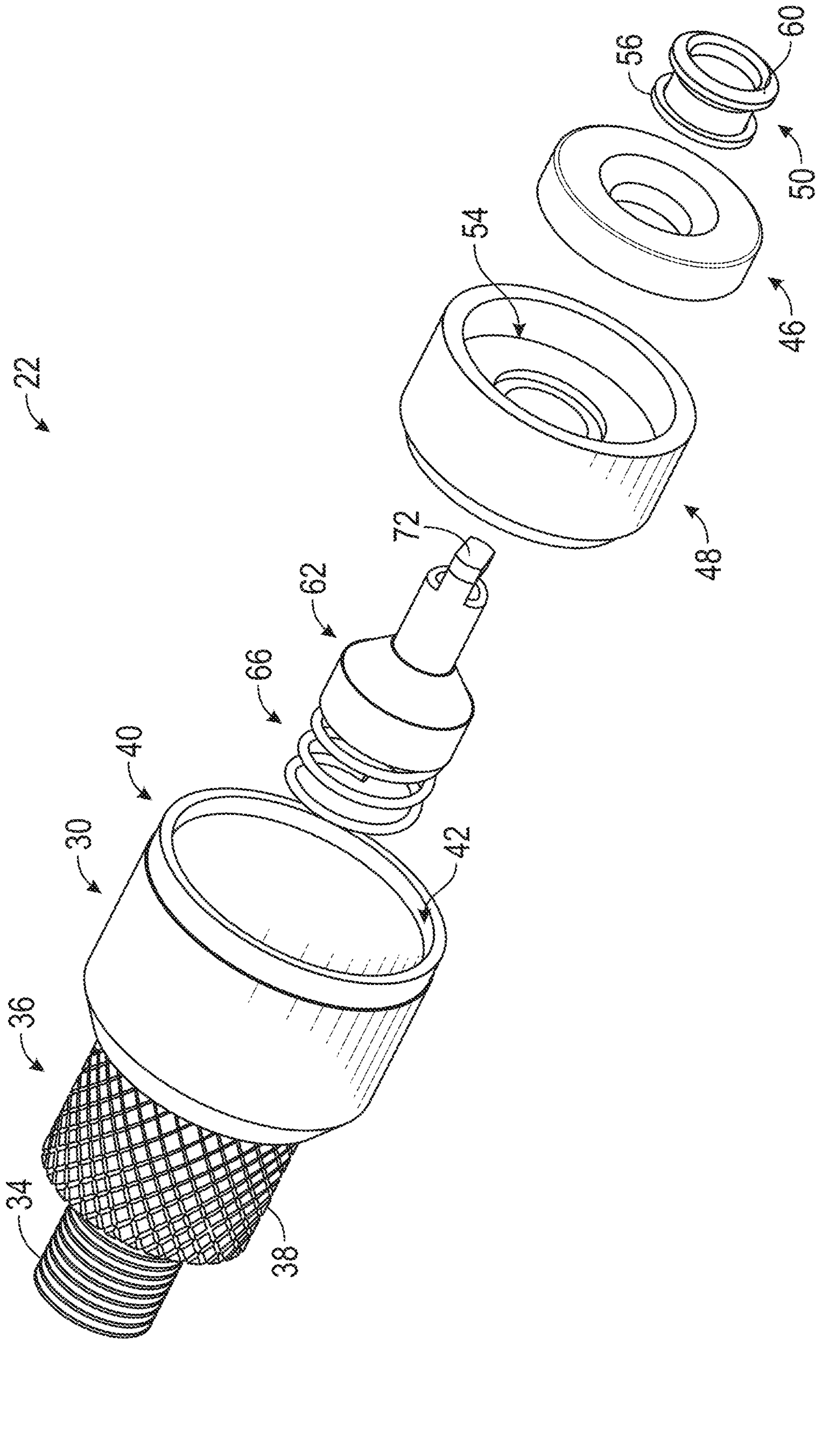
FIG. 4 schematically illustrates an exploded view of the hose adapter of FIG. 2.

Referring to the FIGS., wherein like numerals indicate like parts referring to the drawings, wherein like reference numbers refer to like components, FIG. 1 is a schematic illustration of an example pneumatic device 10. In the illustrated example, the pneumatic device 10 includes a rim 12 surrounded by a tire 14 to create an airtight cavity therein. A pneumatic valve 16 selectively controls the flow of fluid into or out of the pneumatic device 10 to achieve a desired pressure level within the pneumatic device 10. A connector assembly 18 selectively connects the pneumatic valve 16 on the pneumatic device 10 to a pressurized fluid source 28. In the illustrated example, the connector assembly 18 includes a valve adapter 20 and a hose adapter 22 that are magnetically connectable to each other. The valve adapter 20 is configured to attach to the pneumatic valve 16 and a hose adapter 22 is configured to attach to a valve fitting 24 on a hose 26 that is fluidly connected to the pressurized fluid source 28.

As shown in FIGS. 2-6, the hose adapter 22 includes a hose connector body 30 extending between a proximal end and a distal end. The hose connector body 30 at least partially defines a hose adapter internal passageway 32 for the pressurized fluid to travel through the hose adapter 22. The proximal end of the hose connector body 30 includes a valve fitting engagement surface 34 that interfaces with the valve fitting 24 shown in FIG. 1.

In the illustrated example, the valve fitting engagement surface 34 includes a threaded surface that allows the valve fitting 24 to be threaded thereon. One feature of the valve fitting engagement surface 34 is that it allows the hose adapter 22 to be fixed relative to the valve fitting 24 on the hose 26 such that the user does not need to apply additional pressure to maintain a fluid connection between the hose adapter 22 and the valve fitting 24 when filling the pneumatic device 10. While the illustrated example shows that the valve fitting engagement surface 34 matched a profile of a threaded engagement surface on a Shrader valve, the valve fitting engagement surface 34 can include other profiles that interface with other valve or connection types, such as Presta valves or a quick-release valves.

An intermediate portion 36 of the hose connector body 30 can include a user engagement surface 38 that allows the user to grip the hose connector body 30 when attaching it to the valve fitting 24. In the illustrated example, the user engagement surface 38 includes a knurled surface having increased roughness for grasping by the user to allow the valve fitting engagement surface 34 to be threaded into the valve fitting 24.

The hose connector body 30 also includes a distal end portion 40 adjacent to the distal end. The distal end portion 40 is configured to accept a magnetic assembly 44 and to interface with the valve adapter 20 as discussed in greater detail below. The distal end portion 40 defines a distal end recess 42 surrounded by an outer wall for accepting a magnetic assembly 44 and a portion of the valve adapter 20.

In the illustrated example, the magnetic assembly 44 includes a magnet 46, a magnetic shell 48, and a seal 50. The magnetic shell 48 is comprised of a ferrous material, such as Q235-steel (ASTM A36 Steel), to enhance the magnetic properties of the magnet 46. The magnetic shell 48 can also be coated with a material to prevent corrosion. The magnetic shell 48 is located within the distal end recess 42 with a proximal end and a radially outer surface of the magnetic shell 48 being in direct contact with the hose connector body 30. In one example, the magnetic shell 48 can be press fit into the distal end recess 42 of the hose connector body 30 to secure the magnetic shell 48 therein. In another example, an adhesive is used in place of or in addition to the press fit connection to secure the magnetic shell 48 to the hose connector body 30. The hose connector body 30 can also include a circular standoff 52 that functions as a locator to determine a proper insertion depth of the magnetic shell 48 within the distal end recess 42.

In the illustrated example, the magnet 46 is circular and forms a ring. The magnet 46 is located within a magnet recess 54 in a distal end of the magnetic shell 48. In one example, the magnet recess 54 receives the magnet 46 such that a distal end of the magnet 46 is flush with the distal end of the magnetic shell 48. The magnet 46 can be comprised of a neodymium material with an axial magnetization direction. One feature of utilizing the magnet 46 in connection with the magnetic shell 48 is to improve a magnetic force to attract the valve adapter 20 within the distal end recess 42 as discussed in greater detail below.

The magnetic assembly 44 can also include the seal 50. In the illustrated example, the seal 50 is cylindrical and includes a proximal end flange 56 that is located within a seal recess 58 at least partially defined by the magnetic shell 48 and the magnet 46. One feature of locating the proximal end flange 56 within the seal recess 58 is that it helps to maintain the seal 50 in a fixed axial location relative to the magnetic 46 and the magnetic shell 48. In the illustrated example, the seal 50 also includes a distal end flange 60 having a partial circular cross-section that protrudes axially past a distal end surface of the magnetic assembly 44 formed by the magnetic shell 48 and the magnet 46. One feature of the distal end flange 60 on the seal 50 is to create a seal between the valve adapter 20 and the hose adapter 22 as discussed in greater detail below.

Furthermore, a radially inner surface of the seal 50 interfaces with a spring-loaded retracting pin 62. In this disclosure, radial or radially, axial or axially, or circumferential or circumferentially, is in relation to a longitudinal axis A through the connector assembly 18. The spring-loaded retracting pin 62 is cylindrical in cross section and at least partially defines the hose adapter internal passageway 32 through the hose adapter 22. The retracting pin 62 includes a proximal end having a greater radial dimension that engages the magnetic shell 48 in the magnetic assembly 44 to limit axial movement of the retracting pin 62 in an extended position towards the valve adapter 20. The proximal end of the retracting pin 62 is located within a retracting pin cavity 64 that is at least partially defined by the hose connector body 30 and includes a portion of the hose adapter internal passageway 32. A spring 66 is also located in the retracting pin cavity 64 to bias the retracting pin 62 towards the magnetic assembly 44 and to allow the retracting pin to move into a retracted position.

The retracting pin 62 defines a central passageway 70 that includes a portion of the hose adapter internal passageway 32. The central passageway 70 extends along the longitudinal axis A from an opening at a proximal end to a pair of branched outlets adjacent to a distal end. The pair of branched outlets are separated by a distal end wall portion 72 that includes a valve pin engagement surface 74 for engaging a spring-loaded valve pin 82 on the valve adapter 20 as discussed in greater detail below.

Figure 6:
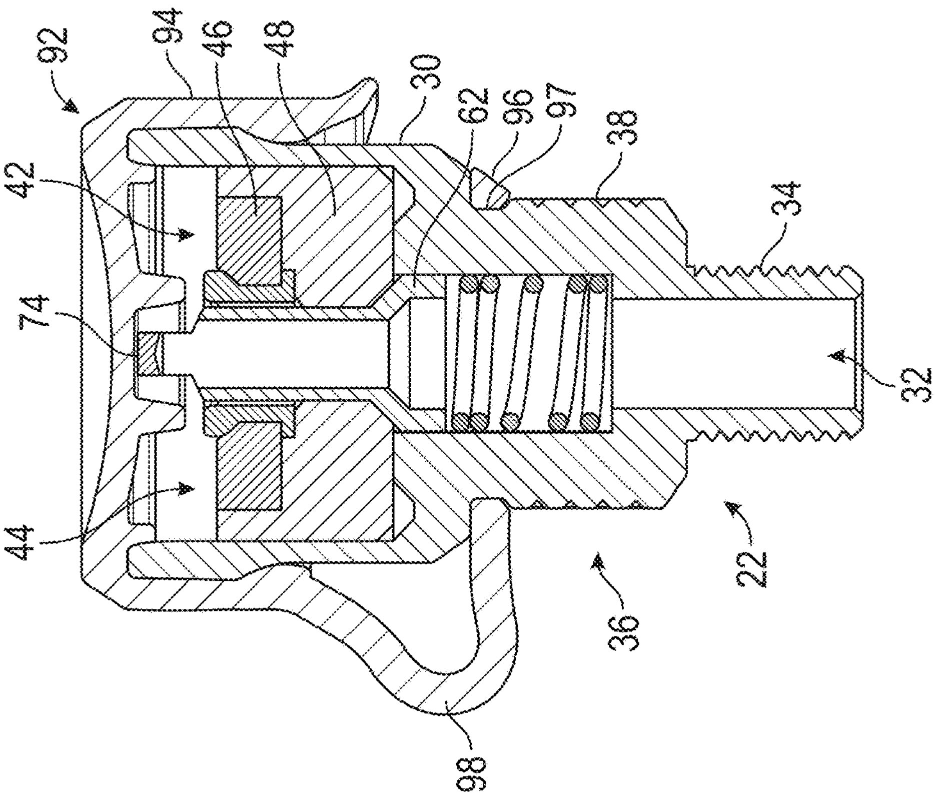
FIG. 6 is a cross-sectional view taken along line 6-6 of FIG. 5.
Figure 5:
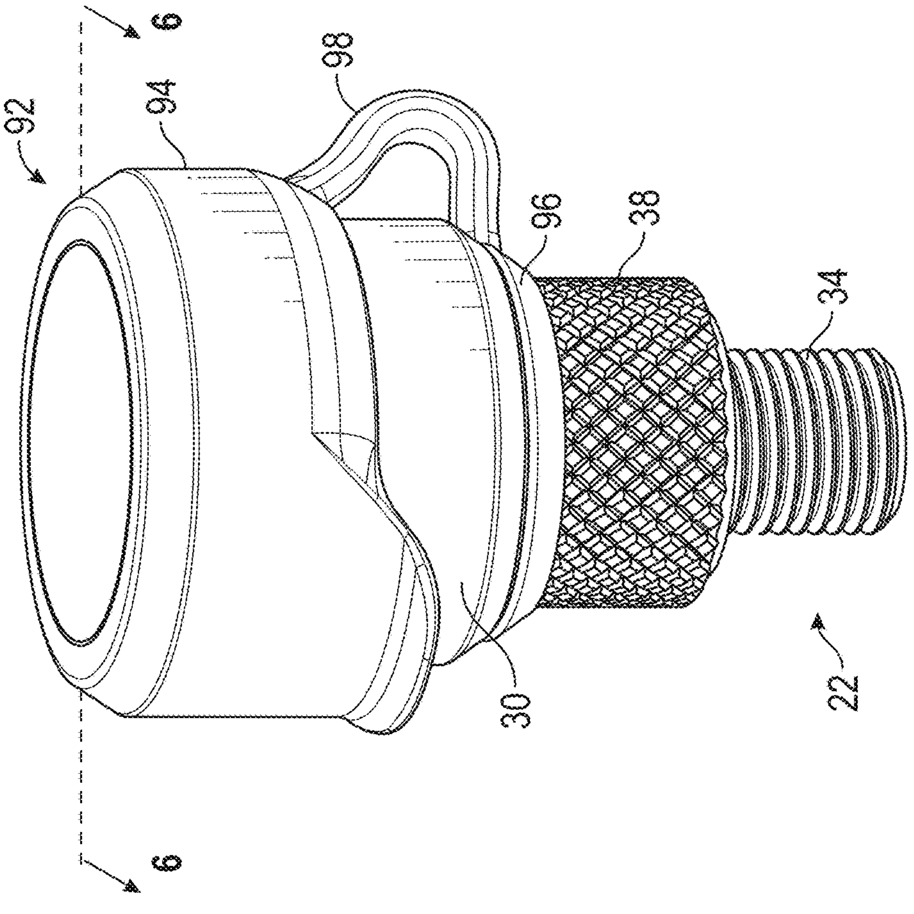
FIG. 5 schematically illustrates a perspective view of a dust cap on the hose adapter of FIG. 2.

Furthermore, as shown in FIGS. 5-6, a dust cap 92 can enclose the distal end of the hose adapter 22 while the hose adapter 22 remains attached to the valve fitting 24. One feature of the dust cap 92 is that it provides a barrier against dirt or debris entering the hose adapter internal passageway 32. In the illustrated example, the dust cap 92 includes a proximal portion 96 that forms a ring and engages a recessed area 97 in an outer surface of the hose connector body 30 adjacent to the user engagement surface 38. The dust cap 92 also includes a distal portion 94 that is located adjacent to and surrounds a distal end of the hose adapter 22. The distal portion 94 can contact the valve pin engagement surface 74 on the retracting pin 62 as shown in FIG. 6. The proximal portion 96 and the distal portion 94 are connected by a connecting portion 98, such as a tether, to prevent the distal portion 94 from separating from the hose adapter 22 when the hose adapter 22 is in use.

Figure 7:
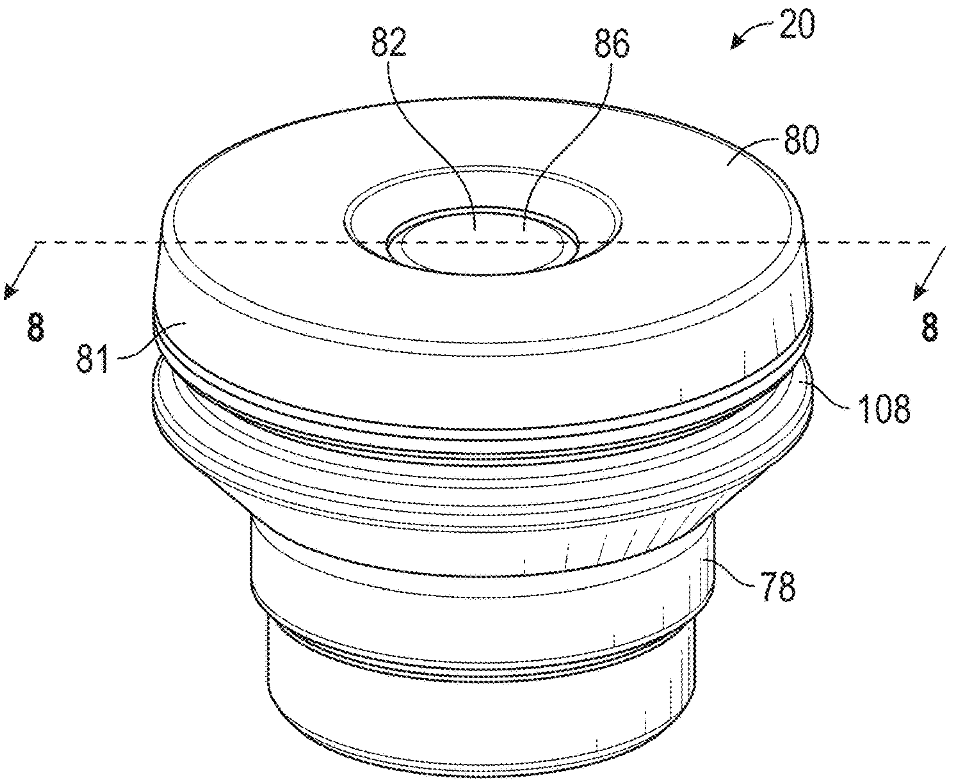
FIG. 7 schematically illustrates a perspective view of a valve adapter.
Figure 8:
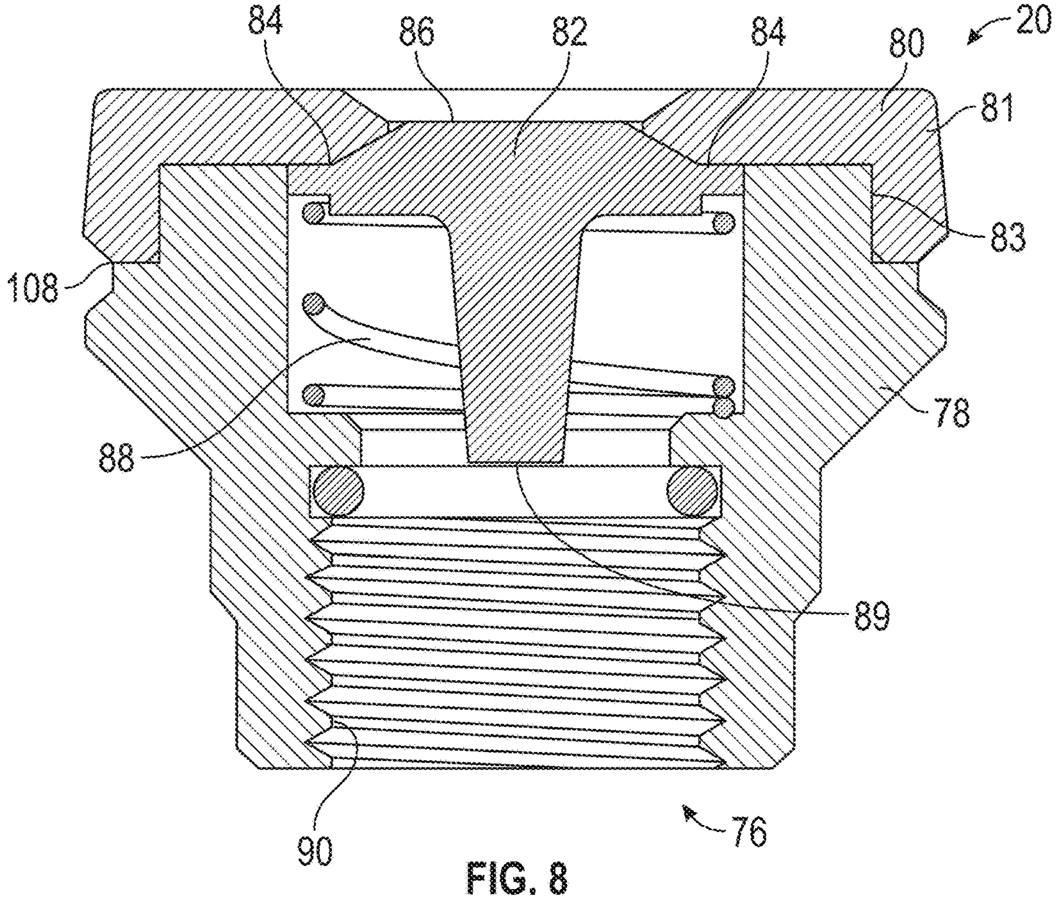
FIG. 8 is a cross-sectional view taken along line 8-8 of FIG. 7.
Figure 9:
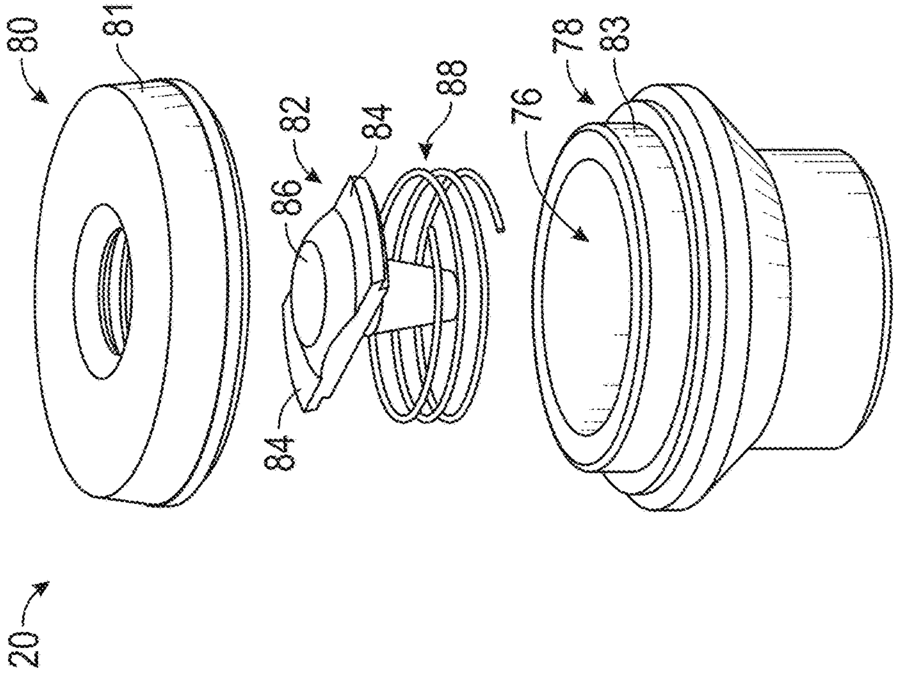
FIG. 9 is an exploded view of the valve adapter of FIG. 7.

FIGS. 7-9 illustrate the valve adapter 20 that connects directly to the pneumatic valve 16 as shown in FIG. 1. In the illustrated example, the valve adapter 20 at least partially defines a valve adapter internal passageway 76 that forms a portion of internal passageway through the connector assembly 18 and is selectively connectable to the hose adapter internal passageway 32 to allow pressurized fluid to flow through the connector assembly 18 in either direction. In the illustrated example, the valve adapter 20 includes a valve connector body 78 that extends between a proximal end and a distal end and at least partially surrounds the valve adapter internal passageway 76.

A strike plate 80 is located adjacent to the proximal end of the valve connector body 78. In the illustrated example, the strike plate 80 forms a ring with a radially inner diameter of the ring surrounding a portion of the valve adapter internal passageway 76 and a radially outer portion including an axially extending flange 81. The axially extending flange 81 surrounds a lip 83 on the proximal end of the valve connector body 78. In one example, the strike plate 80 is fixed relative to the valve connector body 78 with an adhesive. As shown in FIG. 8, a radially outer diameter of the strike plate 80 is less than or equal to an inner diameter of the distal end recess 42. This allows the valve adapter 20 to be accepted within the distal end recess 42 with limited lateral movement between the valve adapter 20 and the hose adapter 22.

In the illustrated example, the strike plate 80 is comprised of a ferrous material that is attracted by the magnet 46. The strike plate 80 can also be coated in a material to prevent corrosion and allows the strike plate 80 to slide along the hose connector body 30 with reduced friction. Also, the valve connector body 78 can be comprised of a dissimilar material from the strike plate 80, such as aluminum or a polymer based material. One feature of forming the valve connector body 78 from a dissimilar material to the strike plate 80, such as a non-ferrous material, is that it improves the connection and alignment between the strike plate 80 and the magnet 46 by preventing the magnet 46 from being attracted to another portion of the valve adapter 20.

Figure 10:
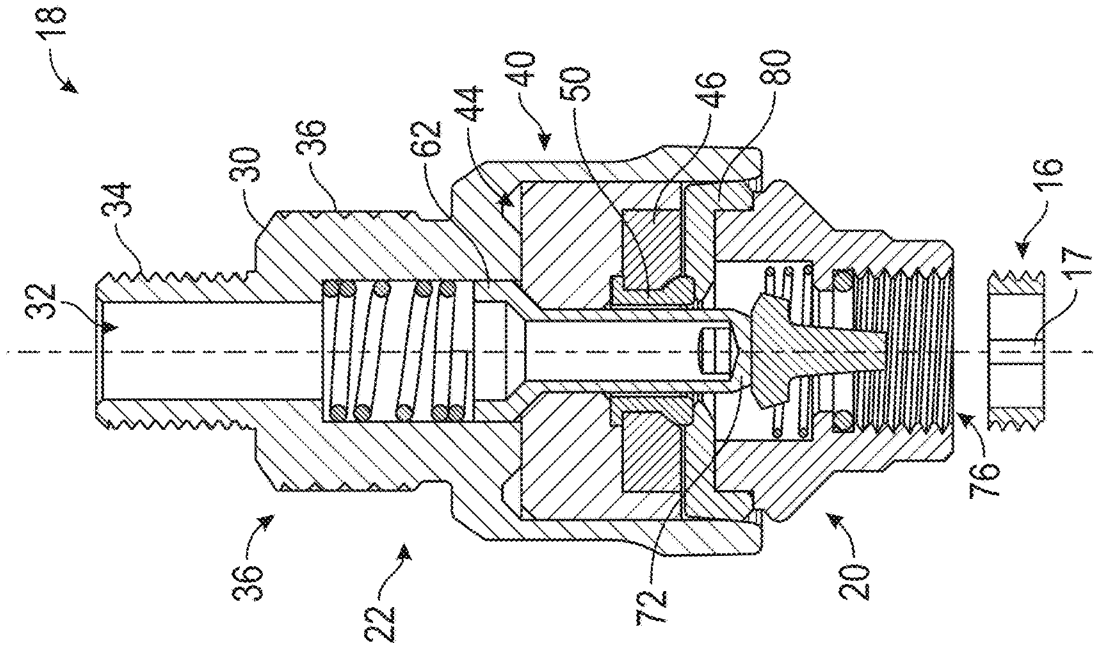
FIG. 10 is a cross-sectional view of the connector assembly of FIG. 2 in an open position.

A spring-loaded valve pin 82 is located within valve adapter internal passageway 76 to selectively allow fluid to pass through the valve adapter 20 into or out of the pneumatic valve 16. As shown in FIGS. 8-10, the valve pin 82 is T-shaped in cross-section with a pair of wings 84 extending radially outward adjacent to a proximal end of the valve pin 82. One feature of the wings 84 is to provide a surface for a spring 88 to engage the valve pin 82 while still allowing fluid to flow around the valve pin with limited restrictions when the valve pin 82 is in the open position.

A plug 86 extends from the proximal end of the valve pin 82 to create a seal with the strike plate 80 when a spring 88 biases the valve pin 82 towards a closed or retracted position. As shown in FIG. 6, a radially inner perimeter of the strike plate 80 tapers to a point to allow for greater surface contact between the plug 86 and the strike plate 80. Additionally, the tapered radially inner surface of the strike plate 80 aids in centering the plug 86 when the valve pin 82 is in the closed position. Because the pneumatic valve 16 retains its ability to seal the pneumatic device 10 independent of the valve adapter 20, the valve pin 82 is not required to maintain a seal sufficient to prevent leakage of the pressurized fluid from within the pneumatic device 10.

A spring 88 biases the valve pin 82 toward a closed position against the strike plate 80. A spring stiffness of the spring 88 is less than a spring stiffness of the spring 66. This allows the biasing force of the spring 66 to overcome the biasing force from the spring 88 to move the valve pin 82 into an extended position. This allows a pneumatic valve contact surface 89 on a distal end of the valve pin 82 to be pressed into contact with a valve core pin 17 on the pneumatic valve 16. The spring 88 allows the valve pin 82 to have sufficient travel along the axis A to open the pneumatic valve 16 without applying too much force that the valve adapter 20 and the hose adapter 22 are not allowed to seal together properly.

A distal end of the valve connector body 78 includes a valve engagement surface 90 that is configured to engage the pneumatic valve 16. In the illustrated example, the valve engagement surface 90 defines internal threads that correspond to threads on an outer surface of the pneumatic valve 16. This interface between the valve adapter 20 and the pneumatic valve 16 allows to valve adapter 20 to remain on the pneumatic valve 16 during normal operation of the pneumatic device 10. Furthermore, an O-ring 91 can be located adjacent to the valve engagement surface 90 to improve a seal between the valve adapter 20 and the pneumatic valve 16.

Figure 12:
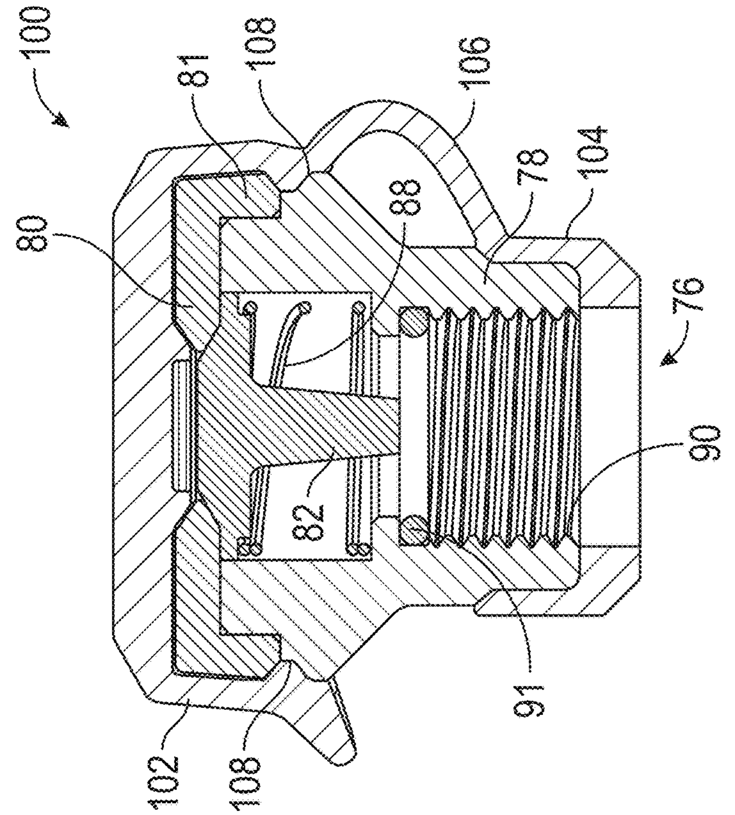
FIG. 12 is a cross-sectional view taken along line 12-12 of FIG. 11.
Figure 11:
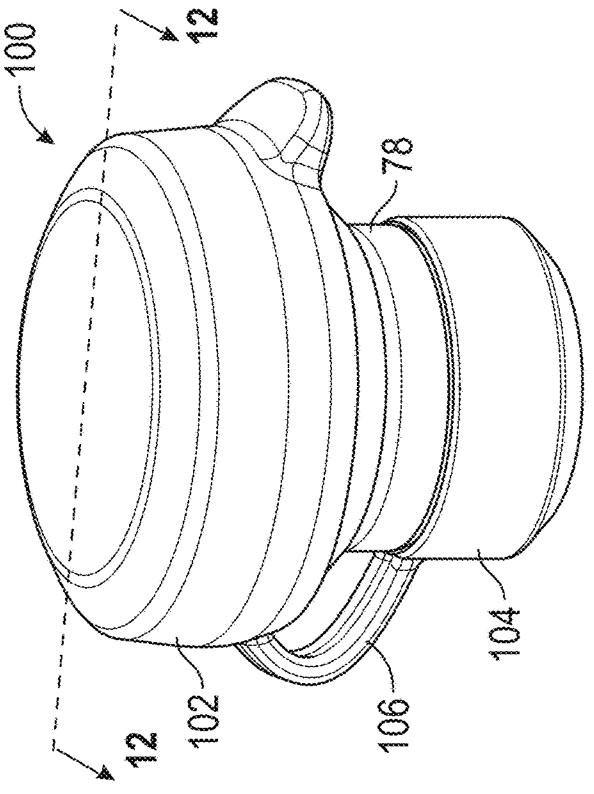
FIG. 11 schematically illustrates a perspective view of a dust cap on the valve adapter of FIG. 7.

Furthermore, as shown in FIGS. 11-12, a dust cap 100 can enclose the proximal end of the valve adapter 20 while the valve adapter 20 remains on the pneumatic device 10 during normal operation of the pneumatic device 10. One feature of the dust cap 100 is that it provides an additional barrier against dirt or debris entering the valve adapter internal passageway 76 and interfering with the valve pin 82.

The dust cap 100 includes a proximal portion 102 that surrounds and engages a recess 108 in the valve adapter 20 located at an intersection of the strike plate 80 and the valve connector body 78. The dust cap 100 includes a distal portion 104 that is located adjacent to and surrounds a distal end of the valve adapter 20. The proximal portion 102 and the distal portion 104 are connected by a connecting portion 106, such as a tether, to prevent the proximal portion 102 from separating from the valve adapter 20 during use of the pneumatic device 10.

Additionally, because a diameter of the distal portion 104 is much less than the proximal portion 102, the dust cap 100 is less likely to separate from the valve adapter 20.

Figure 13:
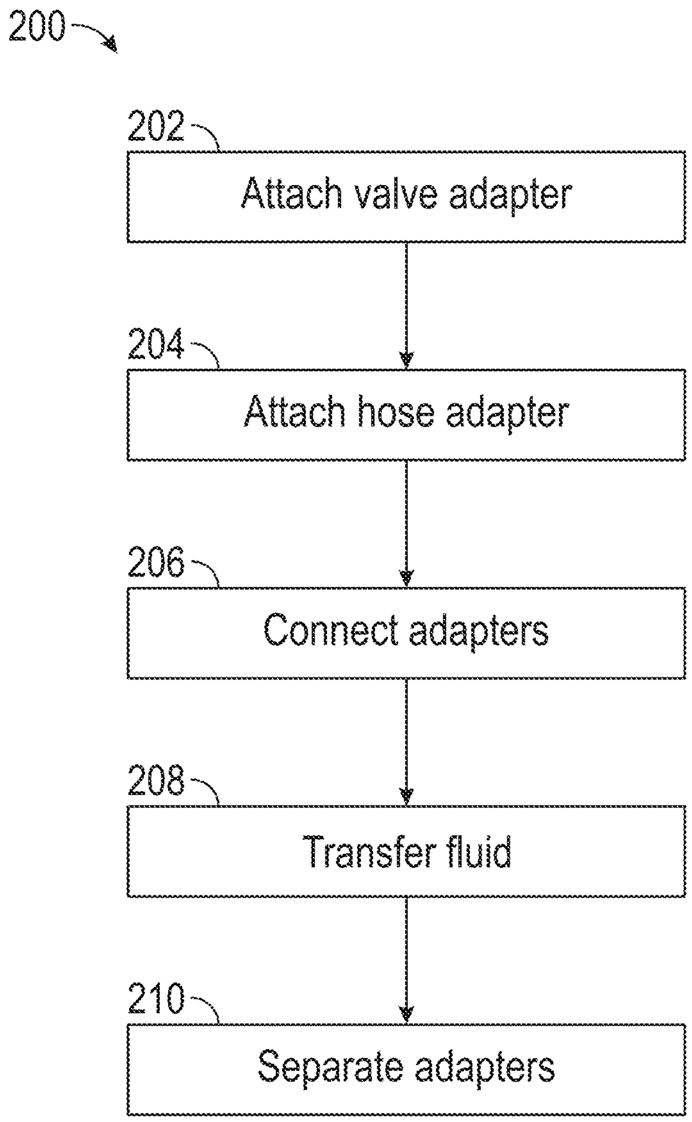
FIG. 13 is a flow chart of a method of operating the connector assembly of FIG. 1.

FIG. 13 illustrates an example method 200 of operating the connector assembly 18. The method 200 begins at block 202. At block 202 ("Attach Valve Adapter"), the valve adapter 20 is attached the pneumatic valve 16 on the pneumatic device 10. In one example, the valve adapter 20 is attached to the pneumatic valve 16 by threading the valve adapter 20 onto the pneumatic valve 16 by engaging the valve engagement surface 90 on the valve adapter 20 with the pneumatic valve 16. The threaded surface on the pneumatic valve 16 can correspond to one of a Schrader valve or a Presta valve. Once the valve adapter 20 is attached to the pneumatic valve 16, the method 200 proceeds to block 204.

At block 204 ("Attach Hose Adapter"), the hose adapter 22 is attached to the hose 26. In one example, the hose adapter 22 is attached to the hose 26 through the valve fitting 24 attached to the distal end of the hose 26. In one example, the valve fitting 24 includes an engagement surface that corresponds to the type of pneumatic valve 16 on the pneumatic device 10. However, because the valve adapter 20 and the hose adapter 22 form an intermediate connection, the valve fitting 24 on the hose 26 can include an engagement surface configured to mate with a dissimilar type of pneumatic valve 16.

One feature of this configuration is that a single hose adapter 22 can be used interchangeably with valve adapters 20 that are connected to dissimilar types of pneumatic valves 16. This prevents an operator from needing to change between hose adapters 22 when engaging the valve adapters 20 on different types of pneumatic valves 16. Furthermore, the order of attaching the hose adapter 22 relative to the hose 26 and the valve adapter 20 relative to the pneumatic valve 16 disclosed above in the method 200 can occur in an opposite order. Once both the valve adapter 20 and the hose adapter 22 are attached relative to the pneumatic valve 16 and the hose 26, respectively, the method 200 proceeds to block 206.

At block 206 ("Connect Adapters"), the hose adapter 22 is connected to the valve adapter 20 to form a fluid connection through the connector assembly 18. The hose adapter 22 is connected to the valve adapter 20 by the magnet 46 on the magnetic assembly 44 being drawn to the strike plate 80 on the valve adapter 20. When the valve adapter 20 and the hose adapter 22 are connected, the strike plate 80 fits flush against the distal end of the magnetic assembly 44. The distal end flange 60 on the seal 50 also contributes to forming an airtight seal between the strike plate 80 and the magnetic assembly 44 to prevent pressurized fluid from one of the hose 26 or the pneumatic device 10 from escaping. The distal end recess 42 formed in the distal end of the hose adapter 22 contributes to properly aligning the hose adapter 22 relative to the valve adapter 20.

Furthermore, when the hose adapter 22 is connected to the valve adapter 20, the valve pin engagement surface 74 on the distal end of the retracting pin 62 engages the valve pin 82 to move the valve pin 82 distally. When the valve pin 82 moves distally, the pneumatic valve contact surface 89 on the valve pin 82 moves the valve core pin 17 in the pneumatic valve 16 between a closed position and an open position. The method 200 then proceeds to block 208.

At block 208 ("Transfer Fluid"), fluid is transferred between the pneumatic device 10 and the hose 26 that is in fluid communication with the pressurized fluid source 28. In one example, a pressure of the fluid within the hose 26 is greater than a pressure of the fluid within the pneumatic device 10, such that fluid travels from the hose 26 and into the pneumatic device 10. In another example, a pressure of the fluid within the hose 26 is less than a pressure of the fluid within the pneumatic device 10, such that fluid travels from the pneumatic device 10 and into the hose 26. Once the fluid has been transferred into or out of the pneumatic device 10 to reach a desired pressure level therein, the method 200 proceeds to block 210.

At block 210 ("Separate Adapters"), the hose adapter 22 is separated from the valve adapter 20. The valve and hose adapters 20, 22 can be separated from each other by applying a force that overcomes the magnetic force between the strike plate 80 and the magnetic assembly 44. When the hose adapter 22 is separated from the valve adapter 20, the valve pin 82 returns to be seated against the strike plate 80. When the valve pin 82 is seated against the strike plate 80, the valve core pin 17 in the pneumatic valve 16 returns to its closed position to prevent fluid from escaping the pneumatic device 10.

Furthermore, once the valve adapter 20 and the hose adapter 22 has been separated, the dust caps 100, 92 can be placed on the valve and hose adapters 20, 22, respectively to prevent debris from entering therein and hindering fluid transfer during future use.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure is not limited to the particular embodiments disclosed but will include embodiments falling within the scope thereof.

What is claimed is:

1. A connector assembly, comprising:

a valve adapter at least partially defining a valve adapter internal passageway, wherein the valve adapter includes:

a valve connector body extending between a proximal end of the valve adapter and a distal end of the valve adapter and at least partially defining the valve adapter internal passageway;

a strike plate attached adjacent to the distal end of the valve connector body;

a valve engagement surface located adjacent to the proximal end of the valve connector body; and a spring-loaded valve pin configured to move between an extended position configured to engage a pneumatic valve and a retracted position; and a hose adapter at least partially defines a hose adapter internal passageway, wherein the hose adapter includes:

a hose connector body extending between a proximal end and a distal end and at least partially defining the hose adapter internal passageway;

a magnet located within a recess adjacent to a distal end of the hose connector body; and a spring-loaded retracting pin including a radially outer surface and a radially inner surface extending between a proximal end and a distal end, wherein the radially inner surface at least partially defines the hose adapter internal passageway and the distal end of the spring-loaded retracting pin is configured to engage the spring-loaded valve pin and the spring-loaded valve pin includes a spring having a first spring stiffness and the spring-loaded retracting pin includes a spring having a second spring stiffness that is greater than the first spring stiffness.

2. The connector assembly of claim 1, wherein the strike plate is comprised of steel.

3. The connector assembly of claim 1, wherein the valve engagement surface is at least partially defined by internal threads.

4. The connector assembly of claim 1, wherein the magnet surrounds the hose adapter internal passageway.

5. The connector assembly of claim 4, including a magnetic shell defining a magnet recess with the magnet located therein and defining an opening surrounding the hose adapter internal passageway.

6. The connector assembly of claim 5, wherein magnet includes an axial magnetization and the magnetic shell is comprised of steel.

7. The connector assembly of claim 1, including a seal in engagement with a radially inner surface of the magnet and a radially outer surface of the spring-loaded retracting pin.

8. The connector assembly of claim 1, wherein the proximal end of the hose connector body includes a threaded engagement surface.

9. The connector assembly of claim 1, wherein the valve connector body and the hose connector body are each comprised of a non-ferrous material.

10. The connector assembly of claim 9, wherein the valve connector body and the hose connector body are each comprised of aluminum.

11. The connector assembly of claim 1, valve engagement surface is configured to engage a first valve type and a proximal end of the hose connector body is configured to engage with valve fitting having a second valve type.

12. A method of operating a connector assembly, the method comprising:

attaching a valve adapter of the connector assembly to a pneumatic valve, wherein the valve adapter at least partially defining a valve adapter internal passageway and includes:

a valve connector body extending between a proximal end of the valve adapter and a distal end of the valve adapter and at least partially defining the valve adapter internal passageway;

a strike plate attached adjacent to the distal end of the valve connector body;

a valve engagement surface located adjacent to the proximal end of the valve connector body; and a spring-loaded valve pin configured to move between an extended position configured to engage a pneumatic valve and a retracted position;

attaching a hose adapter of the connector assembly to a pneumatic hose, wherein the hose adapter at least partially defines a hose adapter internal passageway and includes:

a hose connector body extending between a proximal end of the hose adapter and a distal end of the hose adapter and at least partially defining the hose adapter internal passageway;

a magnet located within a recess adjacent to a distal end of the hose connector body; and a spring-loaded retracting pin including a radially outer surface and a radially inner surface extending between a proximal end and a distal end, wherein the radially inner surface at least partially defines the hose adapter internal passageway and the distal end of the spring-loaded retracting pin is configured to engage the spring-loaded valve pin and the spring-loaded valve pin includes a spring having a first spring stiffness and the spring-loaded retracting pin includes a spring having a second spring stiffness that is greater than the first spring stiffness;

connecting the hose adapter to the valve adapter; and transferring a fluid between the pneumatic hose and the connector assembly.

13. The method of claim 12, including a magnetic shell defining a magnet recess with the magnet located therein and defining an opening surrounding the hose adapter internal passageway, wherein the magnet surrounds the hose adapter internal passageway.

14. The method of claim 13, wherein connecting the hose adapter to the valve adapter includes engaging a distal end of a seal surrounding the spring-loaded retracting pin with the strike plate.

15. The method of claim 12, wherein connecting the hose adapter to the valve adapter includes engaging the spring-loaded retracting pin with the spring-loaded valve pin.

16. The method of claim 15, wherein connecting the hose adapter to the valve adapter includes engaging the spring-loaded valve pin with a valve core of the pneumatic valve.

17. An assembly, comprising:

a pneumatic hose configured to exchange a pressurized fluid;

a valve fitting attached to a distal end of the pneumatic hose;

a connector assembly for engaging the valve fitting, the connector assembly including:

a valve adapter at least partially defining a valve adapter internal passageway, wherein the valve adapter includes:

a valve connector body extending between a proximal end of the valve adapter and a distal end of the valve adapter and at least partially defining the valve adapter internal passageway;

a strike plate attached adjacent to the distal end of the valve connector body;

a valve engagement surface located adjacent to the proximal end of the valve connector body; and a spring-loaded valve pin configured to move between an extended position configured to engage a pneumatic valve and a retracted position; and a hose adapter at least partially defines a hose adapter internal passageway, wherein the hose adapter includes:

a hose connector body extending between a proximal end and a distal end and at least partially defining the hose adapter internal passageway;

a magnet located within a recess adjacent to a distal end of the hose connector body; and a spring-loaded retracting pin including a radially outer surface and a radially inner surface extending between a proximal end and a distal end, wherein the radially inner surface at least partially defines the hose adapter internal passageway and the distal end of the spring-loaded retracting pin is configured to engage the spring-loaded valve pin and the spring-loaded valve pin includes a spring having a first spring stiffness and the spring-loaded retracting pin includes a spring having a second spring stiffness that is greater than the first spring stiffness.

18. The assembly of claim 17, including a pneumatic valve having a first valve type different from a valve type of the valve fitting.

19. The assembly of claim 17, wherein the magnet surrounds the hose adapter internal passageway.

20. The assembly of claim 19, including a magnetic shell defining a magnet recess with the magnet located therein and defining an opening surrounding the hose adapter internal passageway.

* * * * *